United States Patent [19]

Morris

[11] Patent Number: 4,501,758
[45] Date of Patent: Feb. 26, 1985

[54] HONEY COATED NUTS

[75] Inventor: Charles A. Morris, Brooklyn Park, Minn.

[73] Assignee: Henkel Corporation, Minneapolis, Minn.

[21] Appl. No.: 497,335

[22] Filed: May 23, 1983

[51] Int. Cl.³ .......................... A23L 1/36; A23L 1/08
[52] U.S. Cl. ..................................... 426/93; 426/103; 426/293; 426/632; 426/658
[58] Field of Search ................ 426/93, 103, 293, 305, 426/309, 629, 632, 658

[56] References Cited

U.S. PATENT DOCUMENTS

| | | | |
|---|---|---|---|
| 3,063,843 | 11/1962 | Hashimoto | 426/93 |
| 3,103,439 | 9/1963 | Williams | 426/658 |
| 3,314,800 | 4/1967 | Noznick et al. | 426/93 |
| 3,740,236 | 6/1973 | Baxley | 426/293 |
| 4,053,650 | 10/1977 | Chino et al. | 426/93 |
| 4,161,545 | 7/1979 | Green et al. | 426/93 |

*Primary Examiner*—Raymond Jones
*Assistant Examiner*—Elizabeth C. Weimar
*Attorney, Agent, or Firm*—Patrick J. Span; Ernest G. Szoke

[57] ABSTRACT

Nuts are coated by first contacting them with an aqueous sugar and carbohydrate adhesive material, followed by treatment with a dry, honey-containing mixture.

18 Claims, No Drawings

HONEY COATED NUTS

BACKGROUND OF THE INVENTION

1. Field of the Invention

This invention relates to food products and in particular to nuts coated with honey.

2. Description of the Art Practices

It is known from U.S. Pat. No. 4,161,545 issued July 17, 1979 to Green et al that nuts may be coated with honey by mixing water with liquid honey and then coating the nuts with the aqueous mixture. It is also described therein that the honey coated nuts are then enrobed with a dry mixture of sugar and starch and that thereafter the nuts are roasted. U.S. Pat. No. 3,671,266 issued June 20, 1972 to Cooper et al describes a process for producing a hexitol coated nut product.

U.S. Pat. No. 3,063,843 issued Nov. 13, 1962 to Hashimoto describes a process of coating a nutmeat base with a sugary syrup and other ingredients. U.S. Pat. No. 4,053,650 was issued to Chimo et al on Oct. 11, 1977 describing a process for molding confections.

The use of liquid honey for coating nuts is extremely disadvantagous. Few materials are as viscous, sticky and otherwise messy to handle as liquid honey. Liquid honey is also of questionable consistency as the water content is quite variable thus requiring analysis from batch to batch. The question then remains as to how to incorporate honey onto nuts to provide an adequate flavor in a convenient fashion.

The present invention deals with the practice of coating a dried honey onto nuts thereby giving a superior honey flavor and color without the mess of utilizing liquid honey. A product is obtained wherein the sugar, moisture and flavor is uniform. Throughout the specification and claims percentages and ratios are by weight and temperatures are in degrees Celsius unless otherwise indicated.

SUMMARY OF THE INVENTION

The process of manufacturing honey coated nuts from a dried honey product is described including the steps of:
- (a) contacting the nut to be coated with an aqueous mixture of a sugar and a carbohydrate containing adhesive material to coat the nut;
- (b) treating the nut of (a) with a mixture comprising:
  - i. from about 50% to about 90% by weight of a sugar;
  - ii. from about 5% to about 25% by weight of a starch or a dextrine and mixtures thereof; and,
  - iii. from about 5% to about 25% by weight of a dried honey to sufficiently coat the nuts with a taste effective amount of honey; and,
- (c) roasting the nuts; thereby obtaining the honey coated nuts.

There is also described herein a product useful as a source of dried honey which has the following composition;
- (a) from about 90% to about 10% by weight of a starch; and,
- (b) from about 10% to about 90% by weight of a dried honey.

A further useful product herein is:
- (a) from about 10% to about 90% by weight of a sugar; and,
- (b) from about 10% to about 90% by weight of a dried honey.

DETAILED DESCRIPTION OF THE INVENTION

The first component of the present invention is a mixture of a sugar, and a member selected from the group consisting of gum arabic, gum acacia, guar, xanthan, corn syrup solids and mixtures thereof, and dextrine and mixtures thereof in an aqueous mixture. Preferrably the mixture is saturated with respect to the sugar. Preferred sugars for use herein include lactose, maltose, sucrose, glucose, fructose and mixtures thereof. The sugars may be obtained as an essentially pure material (cane sugar) or from a sugar source such as sweet whey (lactose), invert (fructose), high fructose corn syrup (frucose), corn syrup (fructose) or other similar products. Whatever the sugar source used, the sugar content is measured on a dry basis for the sugar content.

The purpose of using the aqueous mixture is to provide an adhesive character to the nuts. The second component mentioned in the aqueous mixture is a material having a suitable adhesive quality which is compatible with the sugar and the remaining components. The carbohydrate containing adhesive serves to bind the ingredients to the nuts. Dextrines are preferred for their adhesive qualities. Preferably the dextrine is a maltodextrine. The dextrose equivalent of the dextrine is preferred in the range of 0 to 42, preferably 2 to 42.

The sugar assists in obtaining a further adhesive quality. The sugar also has the ability to carmelize, or brown upon roasting of the nuts. This aids in providing a more desirable brown nut color quality. The honey also adds color to the nuts upon cooking. It was previously suggested that honey could be employed as an adjesive. While honey is sticky it is not a particularly effective adhesive due to the usage level required and the difficulty of drying the liquid honey when it is used as an adhesive.

The nuts which may be used for practicing the present invention include almonds, peanuts, cashews, pecans, filberts, brazil nuts, and walnuts or other edible nuts. The nuts are shelled and usually blanched. Blanching is the process of removing the skin from the nut. This, in the case of peanuts, is highly desirable to avoid having the coating flake off or to have the nut skin otherwise separate in the finished product.

The nuts are coated with the sugar and carbohydrate containing adhesive in a sufficient amount to substantially retain the mixture (b) during the addition of (b). This is conveniently done by adding from about 1 part to about 8 parts by weight solids of the aqueous mixture to 200 parts of the nuts. Preferably this ratio is from about 2 parts to about 6 parts of the mixture to 200 parts of the nuts. The addition of the mixture to the nuts is conveniently done by any mechanism which allows mixing of the components. In the present invention, it is recommended that a rotating pan be utilized and that the amount of the mixture employed never greatly exceed that required in the end product. The ratio of the carbohydrate containing adhesive to the sugar is conveniently 20:1 to 5:1, preferably 15:1 to 7:1.

After the nuts have been treated with the aforementioned mixture, a second mixture comprising a sugar, a starch and dried honey are employed. The mixture is preferably from about 55% to about 85% by weight of the sugar, from about 7% to about 20% by weight of the starch, and from about 7% to about 20% by weight of the dried honey. The sugar is typically sucrose although other sources of sugar may also be employed including those sugars used in (a) with the carbohydrate adhesive material.

The starch employed at this point in the invention is preferably prime grade wheat starch. Alternatively, other starches may be utilized including potato starch, dextrines which are a hydrolyzed starch, corn starch, tapioca starch or modified food starches.

A suggested source of dried honey utilized in the present invention is described in U.S. Pat. No. 2,693,420 issued Nov. 2, 1954 to Straub and 3,833,413 issued Sept. 3, 1974 to Glabe et al which are herein incorporated by reference. Essentially the product described in the aforementioned patents is from about 20% to about 75% of honey, from about 10% to about 80% by weight starch, preferably wheat, from about 0% to about 50% by weight of a sugar source, from about 0% to about 3% by weight calcium stearate, from about 0% to about 5% soy protein, and from 0% to about 2% of a hydroxylated lecithin. The moisture content of a dried honey is in the range of less than 5% by weight of the honey, preferably less than 3% by weight, most preferably 1.5% to 2.8% by weight. The honey is preferably completely utilized at step (b) however small amounts may be included at (a).

The mixture of the sugar, starch and dried honey is dusted onto the nuts which have been treated with the mixture of the sugar and carbohydrate containing adhesive. The level of usage of the mixture of starch, dried honey and sugar is at from about 5 parts to about 20 parts, preferrably from about 8 parts to about 15 parts per 100 parts of the dry untreated nuts. The honey is employed such that half or more of a panel of untrained tasters would recognize a honey flavor after being informed of the honey content. The dusting is accomplished by any convenient means and may be conducted in a batch operation using the same rotating pan which was used to apply the solution of sugar and adhesive to the nuts. The term dusting means that the mixture is substantially dry or at least does not have a liquid honey character.

After the nuts have been dusted with the mixture of starch, sugar and dried honey, the coated nuts are roasted (cooked) according to the art practices. The roasting may be accomplished using a hot oil bath, preferrably using an oil which does not affect the taste of the nuts. Alternatively, it has become fashionable to roast nuts in an oven so that no additional oil pick-up occurs. The roasting temperature is not critical and for convenience may be between 145° C. and 190° C.

As an additional variable in the present invention, the coated nuts which have been roasted may then be dusted with a sugar and/or salt mixture or with an additional amount of dried honey.

The following exemplifies the present invention.

EXAMPLE I 200 parts of raw shelled peanuts are added to a revolving drum containing baffles to ensure adequate mixing of the nuts. The drum operates at 30 revolutions per minute.

7.5 parts of an aqueous mixture containing 3.2% by weight lactose and 38.5% by weight maltodextrine is added to the rotating nuts. This mixture is added slowly until the nuts are evenly coated.

A mixture of 24.5 parts which is 78% sucrose, 12% wheat starch and 10% of a previously dried honey is prepared. The dried honey has the approximate composition of 31 parts starch and 66 parts honey solids. The peanuts are tumbled until they are evenly coated with the mixture of starch, sugar and the previously dried honey.

The coated nuts are then roasted in peanut oil at 170° C. for 3.5 minutes. The roasted coated nuts are then air cooled for 2 to 3 minutes and lightly dusted with 4 parts of a mixture which is 80% sucrose and 20% table salt.

This Example may be repeated using as a carbohydrate containing adhesive gum arabic, gum acacia, guar, xanthan, or corn syrup solids. Similarly, the sugars utilized throughout may be substituted as described at page 5 of the specification. The honey coated nuts have a substantial honey flavor which is attributed to a even coating which is not substantially impaired by the roasting process.

EXAMPLE II 200 parts of raw peanuts are obtained as described in Example I. 7.5 parts of an aqueous mixture containing 5% by weight sweet whey and 31.3% by weight maltodextrine (Maltron M-100) is slowly added until the nuts are evenly coated.

A mixture of 24.5 parts of the starch, sugar and dried honey mixture described in Example I is slowly added to the tumbling nuts. The process is continued until the nuts are evenly coated.

The coated nuts are cooked in peanut oil 171° C. for a period of 3½ minutes followed by air cooling for 2 to 3 minutes and a dusting as described in Example I.

The nuts obtained in this Example are highly flavorful when compared to nuts manufactured utilizing liquid honey. This Example may be varied by substituting in sequential order, almonds, cashews, pecans, filberts, brazil nuts and walnuts in place of the peanuts. It is also possible due to the consistant nature of the process of the present invention to coat mixed nuts from the abovementioned group. This last mentioned process allow an even coating of the nuts without a substantial dry mixing of the nuts which can become broken or damaged if the mixing is done on the coated nuts.

EXAMPLE III 200 parts of raw peanuts are added to a revolving drum as described in Example I. The drum is operating at 25 revolutions per minute.

7.5 parts of a mixture containing 3.2% by weight lactose and a 38.5% by weight maltodextrine mixture is added to the tumbling nuts. The tumbling is continued until the nuts are evenly coated.

24.5 parts of mixture of starch, sugar and previously dried honey as described in Example I is added to the adhesive coated tumbling peanuts. The particle size of the coating on the nuts is from 0.05 mm to 0.5 mm. The nuts are tumbled until the mixture is evenly coated through limited application of the aforementioned dry mixture.

The nuts are then cooked for 3 to 4 minutes in peanut oil at 171° C. 4.16 parts of a mixture of 80% sucrose and 20% salt is then added to the coated nuts. The nuts described herein are of a golden brown color and present a desirable honey taste.

What is claimed is:

1. A process for coating nuts with a dried honey product including the steps of:

(a) contacting the nut to be coated with an aqueous mixture of a sugar and a carbohydrate containing adhesive material to coat the nut;
(b) treating the nut of (a) with a dry mixture comprising:
   i. from about 50% to about 90% by weight of a sugar;
   ii. from about 5% to about 25% by weight of a starch or a dextrine and mixtures thereof; and,
   iii. from about 5% to about 25% by weight of a dried honey to sufficiently coat the nuts with a taste effective amount of honey; and,
(c) roasting the nuts;
thereby obtaining the honey coated nuts.

2. The process of claim 1 wherein the nuts are roasted in oil.

3. The process of claim 1 wherein the sugar at (b)i is present at from about 55% to about 85% by weight.

4. The process of claim 1 wherein the sugar in (a) is saturated in the aqueous mixture.

5. The process of claim 1 wherein the sugar in (a) is lactose.

6. The process of claim 1 wherein the carbohydrate containing adhesive is a dextrine.

7. The process of claim 1 wherein the starch (b) is wheat starch.

8. The process of claim 1 (b)i wherein the sugar is sucrose.

9. The process of claim 1 wherein the dried honey comprises from about 20% to about 75% by weight honey solids; from about 10% to about 80% by weight starch; and less than about 5% by weight of moisture.

10. The process of claim 1 wherein the component (b)ii is present at from 7% to about 20% by weight.

11. The process of claim 1 wherein the dried honey (b)iii is present at from about 7% to about 20% by weight.

12. The process of claim 1 wherein the ratio of the carbohydrate containing adhesive to the sugar is 20:1 to 5:1.

13. The process of claim 1 wherein (a) is present at from about 1 part to about 8 parts solids to 200 parts nuts.

14. The process of claim 1 wherein (b) is present at from about 5 parts to about 20 parts per 100 parts dry untreated nuts.

15. The process of claim 1 wherein the nuts are roasted at from about 145° C. to about 190° C.

16. The process of claim 1 wherein the nuts are roasted in the absence of oil.

17. A dry product suitable for preparing honey coated nuts comprising:
(a) from about 50% to about 90% by weight of a sugar;
(b) from about 5% to about 25% by weight of a starch or dextrin or mixture thereof; and
(c) from about 5% to about 25% by weight of a dried honey.

18. A product as defined in claim 17 wherein said sugar is sucrose and said starch is wheat starch.

* * * * *